(12) United States Patent
Srinivasan et al.

(10) Patent No.: US 11,973,570 B2
(45) Date of Patent: *Apr. 30, 2024

(54) METHODS AND SYSTEMS FOR ASSISTING RADIO FREQUENCY SELECTION

(71) Applicant: HONEYWELL INTERNATIONAL INC., Charlotte, NC (US)

(72) Inventors: Narayanan Srinivasan, Chennai (IN); Gobinathan Baladhandapani, Madurai (IN); Syed Hakkim, Madurai (IN); Hariharan Saptharishi, Trichy (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 511 days.

This patent is subject to a terminal disclaimer.

(21) Appl. No.: 17/212,879

(22) Filed: Mar. 25, 2021

(65) Prior Publication Data

US 2021/0306067 A1    Sep. 30, 2021

Related U.S. Application Data

(63) Continuation of application No. 15/982,518, filed on May 17, 2018, now Pat. No. 10,992,372.

(51) Int. Cl.
| | | |
|---|---|---|
| *H04B 7/185* | (2006.01) | |
| *G08G 5/00* | (2006.01) | |
| *H04B 1/20* | (2006.01) | |
| *H04B 7/0456* | (2017.01) | |

(52) U.S. Cl.
CPC ......... *H04B 7/18506* (2013.01); *H04B 1/205* (2013.01); *H04B 7/0456* (2013.01); *G08G 5/0013* (2013.01)

(58) Field of Classification Search
CPC .. H04B 7/18506; H04B 7/0456; H04B 1/205; G08G 5/0013
USPC ........................................................ 455/464
See application file for complete search history.

(56) References Cited

U.S. PATENT DOCUMENTS

| | | |
|---|---|---|
| 7,881,832 B2 | 2/2011 | Komer et al. |
| 8,149,141 B2 | 4/2012 | Coulmeau et al. |
| 8,280,741 B2 | 10/2012 | Colin et al. |
| 8,340,839 B2 | 12/2012 | Yogesha et al. |

(Continued)

OTHER PUBLICATIONS

Air-Ground Voice Communications; SKYbrary; (http://www.skybrary.aero/index.php/EUROCONTROL).

(Continued)

*Primary Examiner* — Ted M Wang
(74) *Attorney, Agent, or Firm* — Lorenz & Kopf LLP

(57) ABSTRACT

Systems and methods are provided for monitoring aircraft to mitigate potential loss of communication scenarios. One exemplary method involves monitoring a plurality of communications channels using an onboard communications system, maintaining associations between respective communications channel assignments and respective operational contexts based on the plurality of clearance communications, and in response to detecting a change in an operational context of the aircraft, providing indication of a recommended communications channel based on an association between the recommended communications channel and one of the plurality of different operational contexts corresponding to a current operational context of the aircraft.

20 Claims, 7 Drawing Sheets

(56) References Cited

U.S. PATENT DOCUMENTS

| | | |
|---|---|---|
| 8,909,392 B1 | 12/2014 | Carrico |
| 9,443,433 B1 | 9/2016 | Conway et al. |
| 9,620,119 B2 | 4/2017 | Bilek et al. |
| 2007/0288128 A1 | 12/2007 | Komer et al. |
| 2011/0028147 A1 | 2/2011 | Calderhead, Jr. et al. |
| 2011/0231036 A1 | 9/2011 | Yogesha et al. |
| 2015/0379554 A1* | 12/2015 | Copeland ........... G06Q 30/0239 |
| | | 705/14.39 |
| 2016/0180715 A1 | 6/2016 | Burke et al. |
| 2017/0039858 A1 | 2/2017 | Wang et al. |
| 2020/0259556 A1* | 8/2020 | Chari ................. H04B 7/18513 |

OTHER PUBLICATIONS

Loss of Communication; SKYbrary; (http://www.skybrary.aero/index.php/EUROCONTROL).

Cardosi, K., et al.; Loss of Controller-Pilot Voice Communications in Domestic En Route Airspace; Feb. 2017.

* cited by examiner

_500_

_502_

| | SUGGEST 127.85 | |
|---|---|---|
| 124.575 | 127.870 | COM1 |
| 133.140 | 124.575 | COM2 |
| OME1 111.50 | ID 11075 | NAV1 |
| OME2 110.75 | ID 108.00 | NAV2 |
| ADF 3276.8 | | ADF1 |
| 0000 | STBY | XPOR |

FIG. 5

METHODS AND SYSTEMS FOR ASSISTING RADIO FREQUENCY SELECTION

CROSS-REFERENCE TO RELATED APPLICATIONS

This application is a continuation of U.S. patent application Ser. No. 15/982,518, filed May 17, 2018.

TECHNICAL FIELD

The subject matter described herein relates generally to vehicle systems, and more particularly, embodiments of the subject matter relate to avionics systems and methods for mitigating potential communications issues caused by incorrect radio frequency settings.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft, with a pilot or crewmember onboard that aircraft acknowledging the request (e.g., by reading back the received information) in a separate communication that also includes the call sign. As a result, the ATC can determine that the correct aircraft has acknowledged the request, that the request was correctly understood, what the pilot intends to do, etc.

Unfortunately, there are numerous factors that can cause a failure to hear or reply to a clearance communication, or otherwise result in a misinterpretation of a clearance communication, such as, for example, the volume of traffic in the airspace, similarities between call signs of different aircrafts in the airspace, congestion or interference on the communications channel being utilized, and/or human fallibilities (e.g., inexperience, hearing difficulties, memory lapse, language barriers, distractions, fatigue, etc.). As a result, an incomplete and/or incorrect clearance communication could be acknowledged or acted on by a pilot. One problematic occurrence is a loss of communications scenario, where one aircraft is unable to communicate with a controller, often due to inadvertent mismanagement of communications equipment by a pilot or other aircraft operator. For example, a pilot may mishear a radio frequency assignment, make an error when inputting or selecting a radio frequency, incorrectly anticipate a radio frequency assignment, or simply fail to enable or activate the appropriate communications channel or equipment. As a result, a pilot could be unaware of a potentially prolonged loss of communication with a controller, which could result in an inability to receive clearances, an inability to communicate important information to the controller, potential military interception, or otherwise increase the subsequent pilot workload (e.g., attempting to restore communications once the loss of communication scenario is recognized). Accordingly, it is desirable to provide aircraft systems and methods for mitigating potential loss of communications scenarios. Other desirable features and characteristics of the methods and systems will become apparent from the subsequent detailed description and the appended claims, taken in conjunction with the accompanying drawings and the preceding background.

BRIEF SUMMARY

Aircraft systems and related operating methods are provided. In one embodiment, a method of monitoring an aircraft involves monitoring a plurality of communications channels for a plurality of clearance communications using a communications system onboard the aircraft, maintaining, in a data storage element onboard the aircraft, associations between respective communications channels and respective operational contexts of a plurality of different operational contexts based on the plurality of clearance communications, and in response to detecting a change in an operational context of the aircraft, providing indication of a recommended communications channel based on an association between the recommended communications channel and one of the plurality of different operational contexts corresponding to a current operational context of the aircraft.

In another embodiment, a method comprises concurrently monitoring a plurality of communications channels for a plurality of communications channel assignment communications using a communications system onboard a vehicle, and for each respective communications channel assignment communication of the plurality of communications channel assignment communications, extracting an assigned communications channel from the respective communications channel assignment communication, obtaining a contemporaneous operational context associated with an intended recipient of the respective communications channel assignment communication, and maintaining, in a data storage element onboard the vehicle, an association between the assigned communications channel and the contemporaneous operational context. The method continues by monitoring a current operational context of the vehicle using one or more onboard systems and in response to detecting the current operational context corresponds to the respective contemporaneous operational context for a respective communications channel assignment communication of the plurality of communications channel assignment communications, automatically recommending, via an output device onboard the vehicle, the assigned communications channel extracted from the respective communications channel assignment communication and associated with the respective contemporaneous operational context.

In another embodiment, an aircraft system is provided. The aircraft system includes a communications system onboard an aircraft to obtain a plurality of channel assignment communications for a plurality of different aircraft, a data storage element maintaining associations between a respective assigned communications channel and a respective aircraft operational context for each of the plurality of channel assignment communications, monitoring system onboard the aircraft to provide output indicative of a current operational context of the aircraft, an output interface onboard the aircraft, and a processing system coupled to the data storage element, the monitoring system, and the output interface to monitor the plurality of channel assignment communications, create the associations in the data storage element, and automatically provide indication of a first assigned communications channel as a recommended communications channel when the current operational context corresponds to the respective aircraft operational context associated with the first assigned communications channel.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein:

FIGS. 5-7 depict exemplary graphical user interface (GUI) displays suitable for presentation in the aircraft system of FIG. 1 or the communications channel recommendation system of FIG. 2 in connection with the communications channel recommendation process of FIG. 4 in accordance with one or more exemplary embodiments.

DETAILED DESCRIPTION

Figure 1:
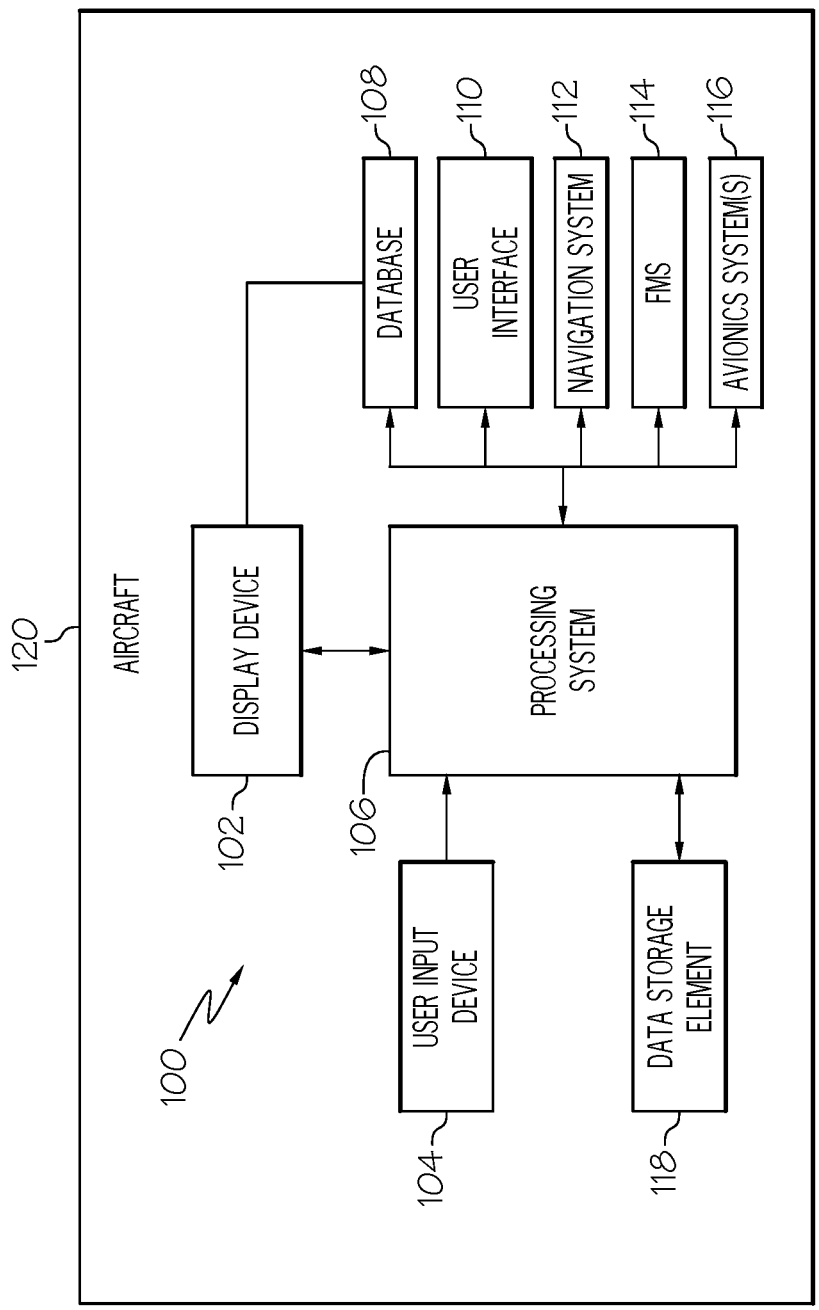
FIG. 1 is a block diagram illustrating an aircraft system in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to systems and methods for mitigating potential configuration or selection errors associated with a communications system onboard a vehicle. For purposes of explanation, the subject matter may be primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below primarily in the context of FIGS. 2-7, in exemplary embodiments, clearance communications associated with different aircraft concurrently operating in a commonly controlled airspace (or alternatively airspaces that are not commonly controlled but adjacent or otherwise within a threshold distance of one another) are continually monitored to identify clearance communications that include instructions pertaining to communications system settings or configurations, such as, for example, radio frequency assignments from air traffic control (ATC). For each identified instruction, the operational context associated with the aircraft that is the intended recipient of the instruction is identified or otherwise determined and stored or maintained in association with the instructed radio frequency or other communications system setting to create a mapping between the recipient aircraft's operational context at the time of the instruction and the instructed radio frequency or setting.

Thereafter, the operational context of a particular aircraft is continually monitored and compared to the mapping between previous communications system instructions and corresponding aircraft operational contexts to detect or otherwise identify when the ownship operational context for that particular aircraft matches a previous operational context associated with one or more other aircraft, for example, in response to a change in the aircraft's current flight phase, geographic location, physical configuration, and/or the like. Based on the relationship between the ownship operational context and one or more previous operational contexts for other aircraft, a recommended radio frequency or communications system setting for the ownship aircraft is determined based on a previously instructed radio frequency or communications system setting for other aircraft having the same or substantially similar operational context in the past. The recommended radio frequency or communications system setting may then be compared to the existing radio frequency or communications system settings onboard the aircraft to determine whether a discrepancy exists, and if so, a notification is generated or otherwise provided that informs the pilot of the recommended radio frequency or communications system setting that was mapped to the current ownship operational context based on previous radio frequency assignments or other ATC instructions for other aircraft. Thus, a pilot, co-pilot, or other aircraft operator may be apprised of the recommended radio frequency or communications system setting when one of the onboard communications systems is not currently configured in a manner consistent with previous aircraft operating in the same controlled area or airspace. For example, if a selected or input radio frequency does not match those assigned to previous aircraft(s) having the same or similar operational context due to a pilot mishearing his or her radio frequency assignment, erroneously entering the radio frequency assignment, incorrectly anticipating or guessing the radio frequency assignment, or otherwise inadvertently and incorrectly configuring an onboard communications system, the pilot may be expeditiously notified of the potential error, thereby reducing the likelihood of a prolonged loss of communications.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, wherein the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some embodiments, the user input device 104 includes or is realized as an audio input device, such as a microphone, audio transducer, audio sensor, or the like, that is adapted to allow a user to provide audio input to the system 100 in a "hands free" manner without requiring the user to move his or her hands, eyes and/or head to interact with the system 100.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In exemplary embodiments, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof.

As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. As used herein, an airport should be understood as referring to a location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. Each airport may have one or more predefined aircraft procedures associated therewith, wherein the aircraft procedure information for each aircraft procedure at each respective airport may be maintained by the data storage element 118. The aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. It should be noted that although the subject matter is described below in the context of departure procedures and/or climbing procedures for purposes of explanation, the subject matter is not intended to be limited to use with any particular type of aircraft procedure and may be implemented for other aircraft procedures (e.g., approach procedures or en route procedures) in an equivalent manner.

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
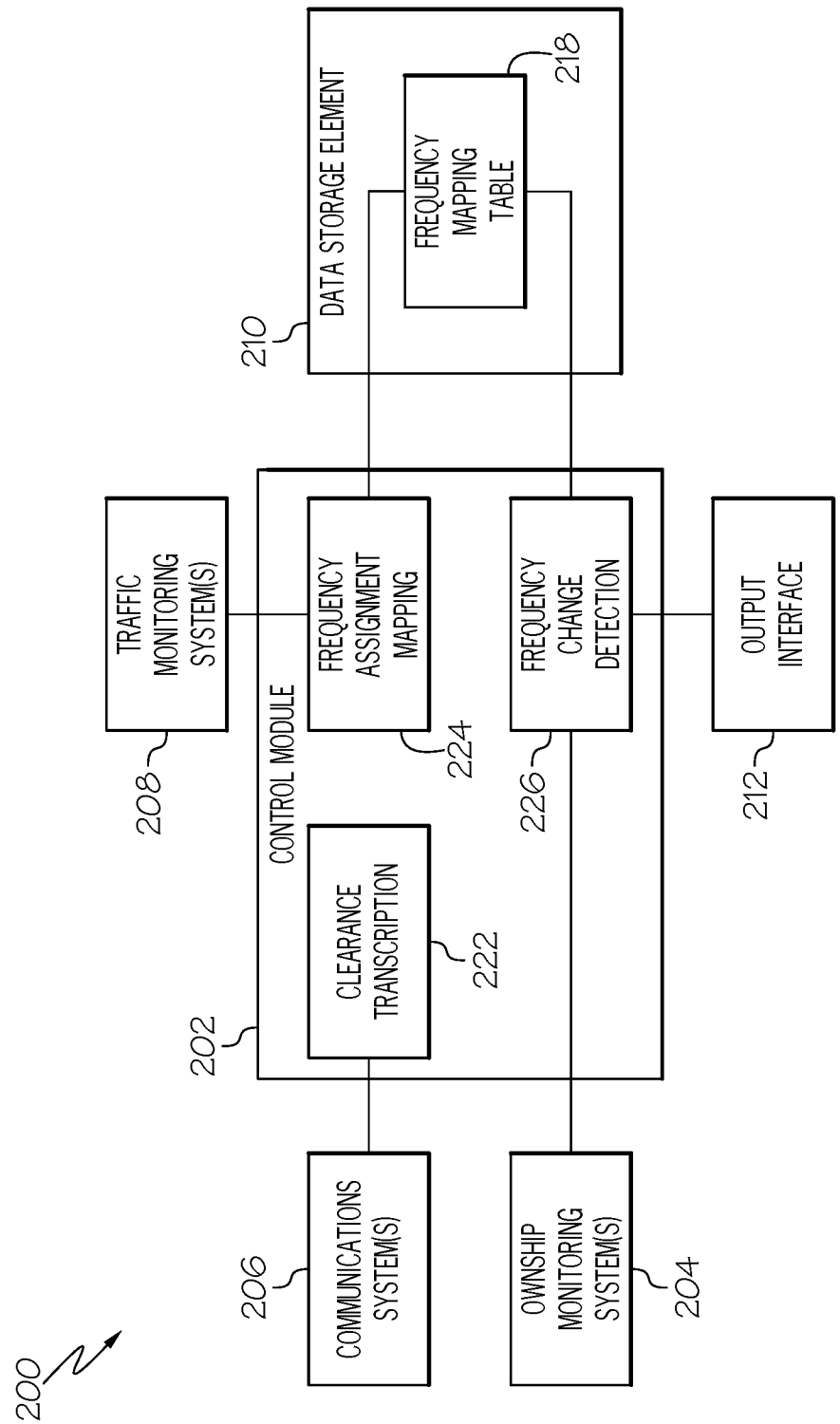
FIG. 2 is a block diagram illustrating a communications channel recommendation system suitable for use with the aircraft system of FIG. 1 in accordance with one or more exemplary embodiments.

FIG. 2 depicts an exemplary embodiment of a communications channel recommendation system 200 for recommending a communications channel for tuning or selection by a vehicle operator in response to a change in ownship operational context. In one or more exemplary embodiments, the channel recommendation system 200 is implemented or otherwise provided onboard a vehicle, such as aircraft 120; however, in alternative embodiments, the channel recommendation system 200 may be implemented independent of any aircraft or vehicle, for example, at a ground location such as an air traffic control facility. That said, for purposes of explanation, the channel recommendation system 200 may be primarily described herein in the context of an implementation onboard an aircraft. As described in greater detail below, the recommended communications channel is identified or otherwise determined by correlating or mapping the current ownship operational context to the prior operational context(s) for other aircraft(s), and then identifying the past communications channel assignments for those aircraft(s) having previously had the same or substantially similar operational context.

The illustrated channel recommendation system 200 includes, without limitation, a control module 202, one or more ownship monitoring systems 204, one or more communications systems 206, one or more traffic monitoring systems 208, a data storage element 210 (or memory), and one or more output user interfaces 212. It should be understood that FIG. 2 is a simplified representation of the channel recommendation system 200 for purposes of explanation and ease of description, and FIG. 2 is not intended to limit the application or scope of the subject matter described herein in any way.

The control module 202 generally represents the processing system of the channel recommendation system 200 and may include any sort of hardware, firmware, circuitry and/or logic components or combination thereof that is coupled to the communications system(s) 206 to receive or otherwise obtain clearance communications and analyze the clearance communications to establish associations with radio frequency channel assignments, as described in greater detail below. Depending on the embodiment, the control module 202 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. In one or more embodiments, the control module 202 may be implemented as part of the processing system 106 onboard the aircraft 120 of FIG. 1. In exemplary embodiments, the control module 202 may also include or otherwise access a data storage element or memory (e.g., memory 210), including any sort of RAM, read only memory (ROM), flash memory, registers, hard disks, removable disks, magnetic or optical mass storage, or any other short or long term storage media or other non-transitory computer-readable medium, which is capable of storing programming instructions for execution by the control module 202. The computer-executable programming instructions, when read and executed by the control module 202, cause the control module 202 to perform or otherwise support the tasks, operations, functions, and processes described herein.

The ownship monitoring system(s) 204 generally represents the navigation system(s), flight management system(s), and/or other onboard avionics system(s) coupled to the control module 202 and capable of providing information pertaining to the current operational context of the aircraft. In this regard, the current operational context of an aircraft may be defined by a combination of parameters, such as, for example, the geographic location of the aircraft (e.g., latitude and longitude coordinates), the altitude (or above ground level) of the aircraft, the heading of the aircraft, the flight phase of the aircraft, and/or the physical configuration of the aircraft (e.g., landing gear configuration, flap configuration, the current procedure being flown or executed, the current or nearest waypoint or navigational reference point, and/or the like).

The communications system(s) 206 (e.g., communications system 110) generally represent the onboard avionics system(s) capable of receiving clearance communications from other sources, such as, for example, an air traffic controller, an automated broadcasting system, other aircraft, and/or the like. Depending on the embodiment, the communications system(s) 206 could include one or more of a very high frequency (VHF) radio communications system, a controller-pilot data link communications (CPDLC) system, an aeronautical operational control (AOC) communications system, an aircraft communications addressing and reporting system (ACARS), and/or the like. In one or more exemplary embodiments, the communications system 206 includes at least two communications radios, with one radio capable of being utilized as an active or primary radio while one or more additional radios are utilized as backup, secondary, or otherwise inactive (or deselected) radios, which may be utilized by a pilot or other vehicle operator to preprogram anticipated radio frequency assignments. In various exemplary embodiments described herein, those secondary, backup, or otherwise inactive radios may be utilized to concurrently monitor different communications channels.

The traffic monitoring system(s) 208 generally represent the onboard avionics system(s) capable of receiving information indicative of the operational context of other aircraft in the vicinity of the ownship aircraft. For example, traffic monitoring system(s) 208 may include an automatic dependent surveillance—broadcast (ADS-B) system capable of receiving information identifying the geographic location, altitude, and/or other real-time information characterizing the current operational aircraft of respective aircraft within the vicinity of the ownship aircraft.

In the illustrated embodiment, computer-executable programming instructions executed by the control module 202 cause the control module 202 to generate, execute, or otherwise implement a clearance transcription application 222 capable of analyzing, parsing, or otherwise processing voice, speech, or other audio input received by the control module 202 to convert the received audio into a corresponding textual representation. In this regard, the clearance transcription application 222 may implement or otherwise support a speech recognition engine (or voice recognition engine) or other speech-to-text system. Accordingly, the control module 202 may also include various filters, analog-to-digital converters (ADCs), or the like, and the control module 202 or the data storage element 210 may store or otherwise a speech recognition vocabulary for use by the clearance transcription application 222 in converting audio inputs into transcribed textual representations.

In the illustrated embodiment, the computer-executable programming instructions executed by the control module 202 also cause the control module 202 to generate, execute, or otherwise implement a frequency assignment mapping application 224 that receives the transcribed textual clearance communications from the clearance transcription application 222 or receives clearance communications in textual form directly from a communications system 206 (e.g., a CPDLC system). The frequency assignment mapping application 224 parses or otherwise analyzes the textual representation of the received clearance communications to identify clearance communications including radio frequency channel assignments. In response to identifying radio frequency channel assignment instructions, the frequency assignment mapping application 224 identifies or otherwise determines the assigned radio frequency channel contained within the communication along with an operational context associated with the aircraft that is the intended recipient of the respective instruction. In some embodiments, the frequency assignment mapping application 224 identifies or otherwise determines an identifier associated with the aircraft that is the intended recipient of the respective instruction by parsing or analyzing the communication (e.g., by identifying a flight identifier, call sign, or other identifier within the textual representation of the clearance communication), and then utilizes the identifier to obtain operational context information associated with that aircraft at or around the time of the instruction from the traffic monitoring system(s) 208. Additionally or alternatively, the frequency assignment mapping application 224 may parse or otherwise analyze the text of the radio frequency channel assignment instruction to identify or otherwise determine an operational context associated with the instruction from within the communication. For example, for each clearance communication received by the frequency assignment mapping application 224 that includes a radio frequency channel assignment, the frequency assignment mapping application 224 may parse or otherwise analyze the textual content of the clearance communication and extract or otherwise identify, if present, one or more of an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), a flight phase, and/or an action associated with the clearance communication (e.g., landing, takeoff, pushback, hold, or the like).

For each clearance communication received by the frequency assignment mapping application 224 that includes a radio frequency channel assignment, the frequency assignment mapping application 224 then generates corresponding radio frequency channel assignment entries in a frequency mapping table 218 in the memory 210 that maintains an association between an assigned radio frequency channel and the respective operational context associated with the respective aircraft being assigned that radio frequency contemporaneous to the radio frequency channel assignment. In this regard, the table 218 maintains all of the clearance communications received by the control module 202 from an onboard communications system 206 that include radio frequency channel assignments, and for each radio frequency channel assignment, maintains an association between the assigned radio frequency channel and the contemporaneous or current operational context associated with the respective aircraft being assigned the respective radio frequency channel.

Still referring to FIG. 2, in the illustrated embodiment, computer-executable programming instructions executed by the control module 202 also cause the control module 202 to generate, execute, or otherwise implement a frequency change detection application 216 that analyzes the relationship between the current operational context information associated with the ownship aircraft provided by the ownship monitoring system(s) 204 and the prior operational contexts associated with prior radio frequency assignments maintained in the frequency mapping table 218 to detect or otherwise identify when the current operational context maps to one or more prior radio frequency assignments. In this regard, as described in greater detail below, when the current ownship operational context maps or otherwise corresponds to one or more prior radio frequency assignments having substantially the same operational context information associated therewith, the frequency change detection application 226 identifies the assigned radio frequency channel associated with those mapped prior radio frequency assignments as a recommended radio frequency channel for the current ownship operational context. When the recommended radio frequency channel is not currently tuned or selected by the appropriate onboard communication system 206, the frequency change detection application 226 generates or otherwise provides a user notification via one or more output user interface devices 212, such as, for example, a display device (e.g., display device 102), an audio output device, or the like. Additionally, in one or more embodiments, the frequency change detection application 226 may transmit or otherwise provide notification to an air traffic controller or another device or system external to the channel recommendation system 200.

Figure 3:
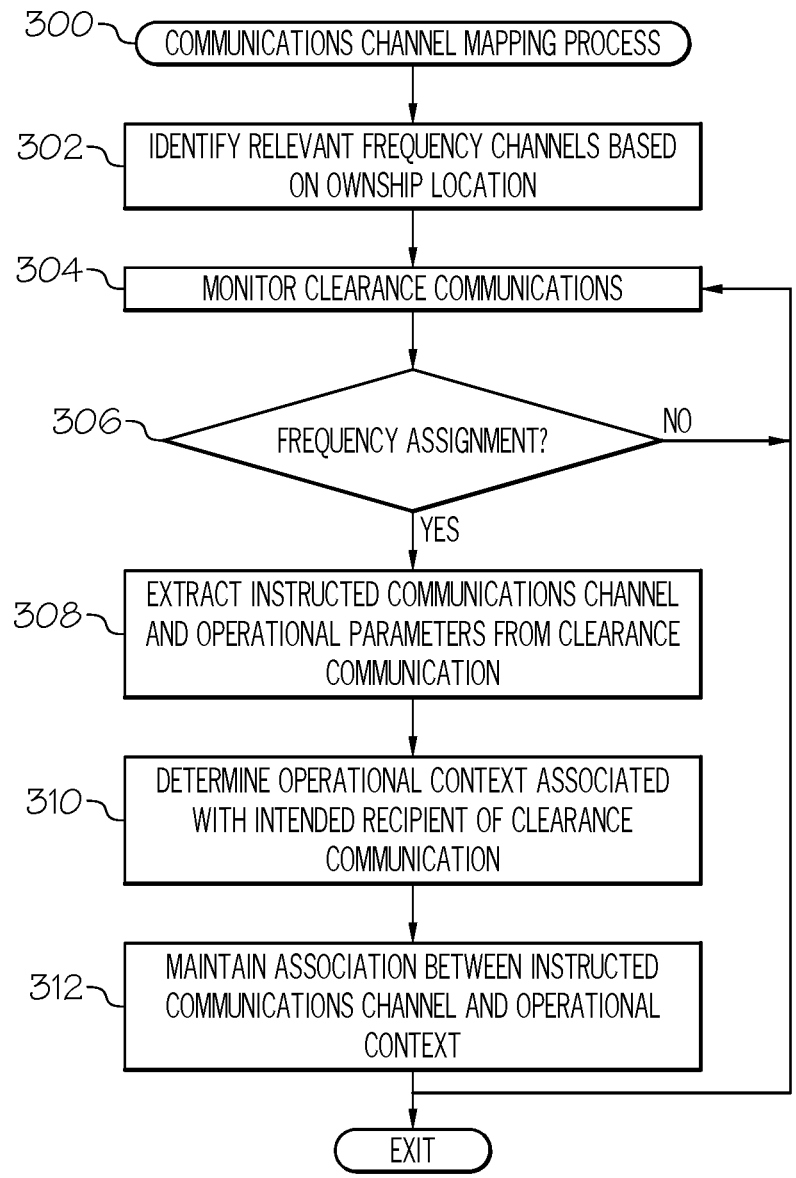
FIG. 3 is a flow diagram illustrating a communications channel mapping process suitable for implementation by the aircraft system of FIG. 1 or the communications channel recommendation system of FIG. 2 in accordance with one or more exemplary embodiments.

Referring now to FIG. 3, in an exemplary embodiment, an aircraft system is configured to support a communications channel mapping process 300 and establish associations or relationships between operational contexts associated with other aircraft contemporaneous to the other aircraft receiving communications channel assignments. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the channel mapping process 300 may be performed by different elements of the aircraft system 100 or the channel recommendation system 200. That said, exemplary embodiments are described herein in the context of the channel mapping process 300 being primarily performed by the control module 202, which may be implemented as part of the processing system 106 and/or FMS 114 onboard the aircraft 120. It should be appreciated that the channel mapping process 300 may include any number of additional or alternative tasks, the tasks need not be performed in the illustrated order and/or the tasks may be performed concurrently, and/or the channel mapping process 300 may be incorporated into a more comprehensive procedure or process having additional functionality not described in detail herein. Moreover, one or more of the tasks shown and described in the context of FIG. 3 could be omitted from a practical embodiment of the channel mapping process 300 as long as the intended overall functionality remains intact.

In one or more exemplary embodiments, the channel mapping process 300 is initiated when an aircraft 120 enters or otherwise begins operating in a controlled airspace or transfers from one airspace to another airspace. In this regard, in one or more embodiments, prior to initializing the channel mapping process 300, the control module 202 may clear or otherwise reset the frequency mapping table 218 for the current operation in the controlled airspace.

In the illustrated embodiment, the channel mapping process 300 begins by identifying or otherwise determining relevant communications channels for monitoring for clearance communications based on the current geographic location of the ownship aircraft (task 302) and the operational context of the ownship aircraft. For example, based on the current geographic location of the ownship aircraft, the control module 202 and/or the frequency assignment mapping application 224 may determine what airspace the aircraft is currently operating within. Additionally or alternatively, in some embodiments, the current heading for the aircraft may be utilized in conjunction with the current geographic location to identify what airspace(s) the aircraft is likely to operate in. Thus, depending on the embodiment, the channel mapping process 300 may monitor communications channels associated with an airspace the ownship aircraft is currently operating within and/or an adjacent airspace that the ownship aircraft is likely to enter.

Once the control module 202 and/or the frequency assignment mapping application 224 identifies the relevant airspace(s) to the current operation of the aircraft, the control module 202 and/or the frequency assignment mapping application 224 may utilize stored procedure information associated with the identified airspace(s) to identify the different radio frequency channels associated with those airspace(s). For example, when the aircraft is within an airspace associated with a particular airport, the control module 202 and/or the frequency assignment mapping application 224 may locate the procedure information associated with that airport in memory 118, 210, and then identify the various communications frequencies associated with that airport provided by that airport's procedure information, such as, for example, the clearance delivery radio frequency channel, the ground control radio frequency channel, the tower radio frequency channel, the approach control radio frequency channel, the departure control radio frequency channel, and/or other air traffic control radio frequency channels.

In some embodiments, after obtaining a list of radio frequency channels associated with the airspace(s) relevant to the current operation of the aircraft, the control module 202 and/or the frequency assignment mapping application 224 may further filter the list of radio frequency channels based on the current operational context of the aircraft to remove or otherwise exclude radio frequency channels unlikely to be relevant to future operation of the aircraft. For example, if the aircraft is at an initial stage of the flight plan or about to depart, any approach-related communications channels may be filtered or otherwise excluded based on the fact that the aircraft is unlikely to conduct an approach to the departure airport in its flight plan. In this regard, the control module 202 and/or the frequency assignment mapping application 224 may limit the list of radio frequency channels to be monitored to those that are likely to pertain to the current operational context of the aircraft or the probable future operational contexts for the aircraft. For example, the control module 202 and/or the frequency assignment mapping application 224 onboard an aircraft waiting to begin taxiing from a gate may identify radio frequency channels related to ground control and departure control as the relevant frequencies for monitoring based on the likelihood that the aircraft is about to taxi en route to departure, while conversely, for an aircraft en route to the airport, approach control and ground control frequencies may be identified as the relevant frequencies for monitoring based on the likelihood that the aircraft is about to approach or land and then taxi to a gate or other destination on the ground.

Referring again to FIG. 3, after identifying the relevant communications channels for monitoring, the channel mapping process 300 continues by concurrently monitoring different communications channels for communications that include communications channel instructions or assignments for other aircraft (task 304). In exemplary embodiments, the radio frequency channel that is currently tuned or selected as active at the onboard communications system(s) 206 is monitored. Additionally, in exemplary embodiments, one or more of the radio frequency channels identified as being relevant to the current or anticipated operational context of the aircraft are also monitored concurrently using any available backup radios or standby frequencies supported by the communications system(s) 206. In this regard, the clearance transcription application 222 may be concurrently receiving clearance communications from different radio frequency channels associated with the airspace the aircraft is operating in and/or nearby airspaces the aircraft is likely to operate in (e.g., based on the current heading, the route defined by the flight plan, and/or the like). For example, some embodiments of the system 200 may support software defined radios at the control module 202 or the communications system 206 that enables the clearance transcription application 222 to concurrently monitor each of the radio frequency channels identified as being relevant for monitoring in the background while another active frequency is currently being monitored or listened to by the pilot.

The channel mapping process 300 continues by concurrently monitoring different communications channels for clearance communications including a radio frequency instruction or assignment (task 306). In response to identifying a clearance communication including a radio frequency assignment, the channel mapping process 300 extracts or otherwise identifies the assigned radio frequency from the clearance communication along with other operational context parameters associated with the radio frequency assignment (task 308). In one or more exemplary embodiments, the frequency mapping application 224 may identify the assigned radio frequency, the aircraft identifier or intended recipient of the assignment, and if present, the flight phase or other operation or action associated with the assignment communication. For example, a communication on the tower radio frequency channel may instruct a particular aircraft (using the aircraft's call sign or identifier) to contact ground control at 125.325 MHz for taxiing, where the frequency mapping application 224 identifies the assigned frequency as 125.325 MHz, the intended recipient aircraft's call sign or identifier, and "taxi" as the flight phase associated with the radio frequency assignment.

In exemplary embodiments, the channel mapping process 300 identifies or otherwise determines the operational context associated with an aircraft receiving a radio frequency assignment at or around the time of the assignment and then updates a frequency assignment mapping table to maintain an association between the assigned radio frequency channel and the aircraft's operational context at or around the time of the assignment (tasks 310, 312). For example, using the intended recipient aircraft's call sign or identifier extracted from the clearance communication, the frequency mapping application 224 may obtain the current or most recent broadcast data pertaining to that aircraft from the traffic monitoring system 208 that identifies the geographic location of the aircraft, the current altitude of the aircraft, and potentially other parameters pertaining to the current operational context of the aircraft at the time the radio frequency assignment was provided to the aircraft. Continuing the above example, the frequency mapping application 224 then updates the frequency mapping table 218 to maintain an association between the 125.325 MHz being assigned for the "taxi" flight phase at the contemporaneous geographic location, altitude, and/or other operational context parameters for that aircraft.

The communications channel mapping process 300 may repeat continually while the ownship aircraft is operating within a particular airspace to continually monitor different radio frequency channels associated with that airspace (or a neighboring airspace) and dynamically update the frequency mapping table 218 in response to additional radio frequency assignments. Thus, the frequency mapping application 224 may continually build up a data set in the frequency mapping table 218 that allows the assignment of different radio frequency channels to be mapped to different aircraft operational contexts at the time of assignment, which, in turn, may be indicative of or predictive of an aircraft operating state where a particular radio frequency channel change should occur.

Figure 4:
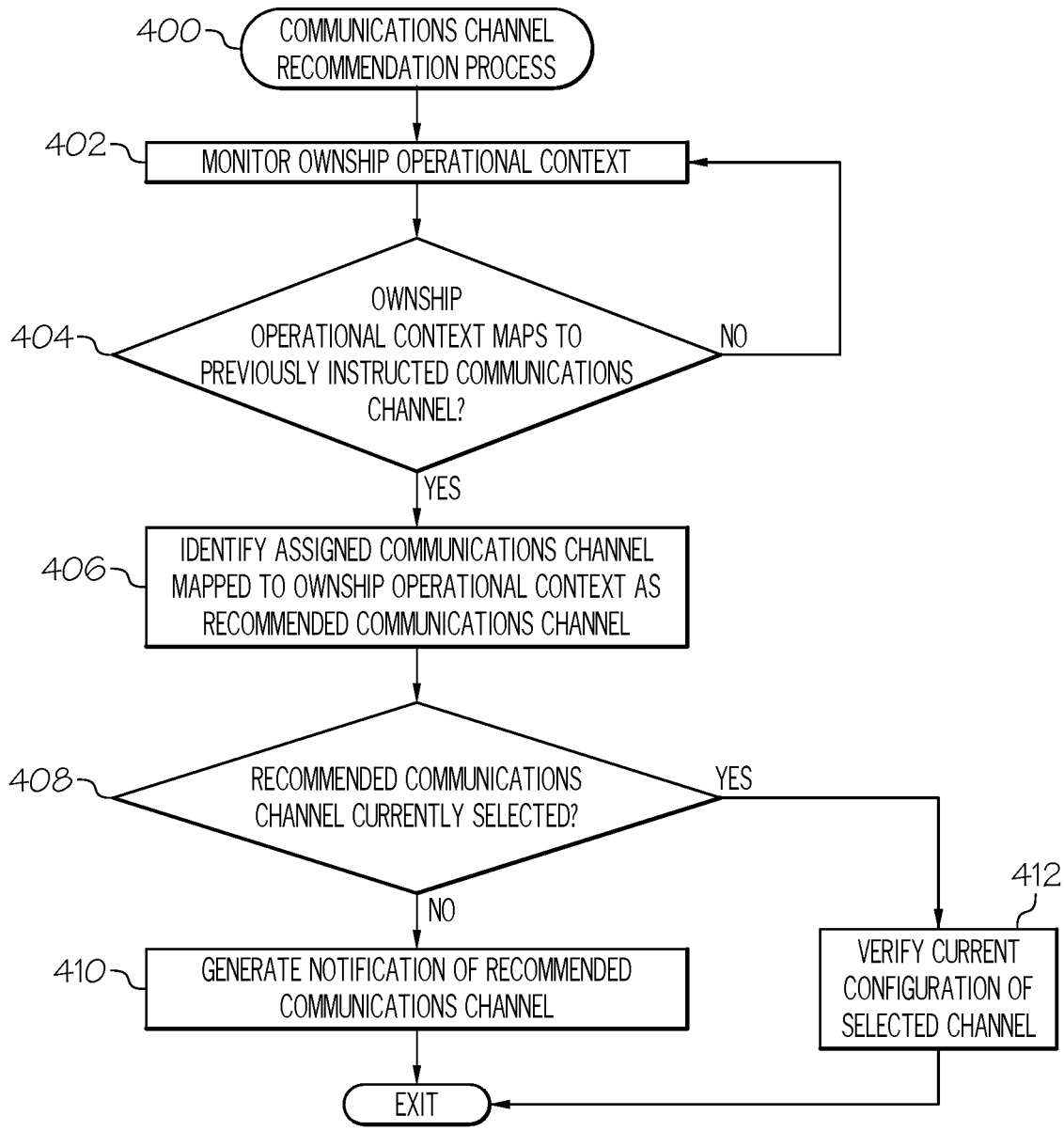
FIG. 4 is a flow diagram illustrating a communications channel recommendation process suitable for implementation by the aircraft system of FIG. 1 or the communications channel recommendation system of FIG. 2 in accordance with one or more exemplary embodiments.

FIG. 4 depicts an exemplary embodiment of a communications channel recommendation process 400 that may be implemented by an aircraft system in conjunction with the communications channel mapping process 300 to detect or otherwise identify a recommended communications channel based on a correlation between the current ownship operational context and past operational contexts associated with other aircraft contemporaneous to the other aircraft receiving communications channel assignments. The various tasks performed in connection with the illustrated process 400 may be implemented using hardware, firmware, software executed by processing circuitry, or any combination thereof. For illustrative purposes, the following description may refer to elements mentioned above in connection with FIGS. 1-3. In practice, portions of the channel recommendation process 400 may be performed by different elements of the aircraft system 100 or the channel recommendation system 200. That said, exemplary embodiments are described herein in the context of the channel recommendation process 400 being primarily performed by the control module 202 and/or the frequency change detection application 226, which may be implemented as part of the processing system 106 and/or FMS 114 onboard the aircraft 120. It should be appreciated that the channel recommendation process 400 may include any number of additional or alternative tasks, the tasks need not be performed in the illustrated order and/or the tasks may be performed concurrently, and/or the channel recommendation process 400 may be incorporated into a more comprehensive procedure or process having additional functionality not described in detail herein. Moreover, one or more of the tasks shown and described in the context of FIG. 4 could be omitted from a practical embodiment of the channel recommendation process 400 as long as the intended overall functionality remains intact.

The channel recommendation process 400 continually monitors the ownship operational context and analyzes the ownship operational context with respect to past aircraft operational contexts mapped to communications channel assignments for other aircraft to detect or otherwise identify when the current ownship operational context corresponds to one where a communications channel assignment was previously issued or received by another aircraft (tasks 402, 404). When the current ownship operational context matches with, corresponds to, or otherwise maps to one or more past aircraft operational contexts associated with one or more prior communications channel assignments, the channel recommendation process 400 identifies the assigned communications channel for the mapped communications channel assignment(s) as the recommended communications channel for the ownship aircraft (task 406). In some embodiments, the current flight phase and/or subsequent flight phases for the ownship aircraft may be utilized to filter or otherwise reduce the number of entries from the frequency mapping table 218 that are being monitored or analyzed for a potential match. For example, if the current ownship flight phase is approach and the subsequent flight phase(s) may be identified or otherwise determined to be landing and/or taxiing, which, in turn may be utilized by the frequency change detection application 226 to identify radio frequency assignment entries pertaining to the ground controller radio frequency or those subsequent flight phase(s) for monitoring while excluding from consideration other radio frequency assignment entries that are unlikely to be relevant based on the current and/or anticipated subsequent flight phase(s) of the ownship aircraft. Additionally, it should be noted that in some embodiments, the current ownship operational context may be matched or mapped to a past aircraft operational context associated with a prior communications channel assignment probabilistically without requiring a perfect match. For example, if more than a threshold number of fields or parameters of the operational contexts match, or if one or more fields or parameters of the current ownship operational context is within a threshold amount of the past aircraft operational context, the current ownship operational context may be matched or mapped to the past aircraft operational context without requiring an identical match.

In one or more exemplary embodiments, the control module 202 and/or the frequency change detection application 226 may continually obtain, from one or more onboard systems 204, information indicative of the current geographic location of the aircraft, the current altitude of the aircraft, the current flight phase of the aircraft, and/or other information indicative of the current operational context of the ownship aircraft. The frequency change detection application 226 may then search or query the frequency mapping table 218 for any past radio frequency assignment entries having associated operational context parameter values that match one or more of the current operational context parameters for the ownship aircraft. In the absence of any matching entries in the frequency mapping table 218, the frequency change detection application 226 may utilize the geographic location, altitude, heading, and/or other operation context parameters associated with entries the frequency mapping table 218 to identify any past radio frequency assignments associated with locations or positions that are within a threshold distance of the current ownship location or position. When the current ownship operational context parameter values match or are otherwise substantially similar to (e.g., within a threshold distance of) those stored in association with a previous radio frequency assignment entry, the frequency change detection application 226 may determine that a radio frequency channel change is probable or anticipated with respect to the ownship aircraft and identifies the assigned radio frequency associated with that matching entry in the frequency mapping table 218 as the recommended radio frequency channel for the ownship aircraft.

For example, the frequency mapping table 218 may indicate that a particular tower radio frequency channel is assigned for departure when one or more other aircraft traverse one or more particular geographic locations. In this regard, the past geographic location(s) associated with the tower radio frequency channel assignment may be utilized by the channel recommendation process 400 as a reference geographic location for recommending the previously assigned tower radio frequency channel. When there are multiple instances of the tower radio frequency channel assignment in the mapping table 218 corresponding to different aircraft having different geographic locations at the time of the respective assignments, the different geographic locations associated with the different aircraft may be averaged or otherwise combined to obtain a reference geographic location for recommending the previously assigned tower radio frequency channel. Subsequently, while the aircraft is taxiing for departure, the frequency change detection application 226 may continually analyze the onboard systems 204 to detect when the tower radio frequency channel is likely to be relevant to the ownship aircraft.

The frequency change detection application 226 may determine the current operational context for the aircraft is taxiing en route for departure based on one or more of the output from the FMS indicating the ownship aircraft is in the taxiing flight phase, the onboard navigation system indicating the ownship aircraft is on the ground, and/or the status of the ownship aircraft with respect to a flight plan maintained by the FMS. The frequency change detection application 226 may identify the previously-assigned radio frequency channel for departure(s) as the likely next radio frequency channel assignment for the ownship aircraft and identify a reference geographic location and potentially other reference operational context parameters from the frequency mapping table 218. The frequency change detection application 226 then continually monitors the current geographic location of the ownship aircraft output by the onboard navigation system(s), the current flight phase output by the FMS, and/or potentially other operational context parameters associated with the ownship aircraft to detect when the current ownship operational context corresponds to the reference operational context associated with the departure radio frequency assignment in real-time. For example, in some embodiments, the frequency change detection application 226 may detect when the current ownship flight phase changes to the departure flight phase. In other embodiments, the frequency change detection application 226 may detect the departure radio frequency assignment is appropriate for the ownship aircraft when the current geographic location of the ownship aircraft is within a threshold distance of the reference operational context associated with the departure radio frequency assignment while the other ownship operational context parameters (e.g., flight phase, current altitude, landing gear configuration, and/or the like) also indicate that the ownship aircraft should likely receive a departure radio frequency assignment. Thus, when the current ownship operational context matches or otherwise maps to the reference operational context associated with the previous departure radio frequency assignment(s), the frequency change detection application 226 determines the previously-assigned radio frequency channel for departures as the recommended communications channel for the ownship aircraft.

Still referring to FIG. 4, in exemplary embodiments, the channel recommendation process 400 verifies or otherwise determines whether or not the recommended communications channel is currently selected or otherwise active onboard the aircraft, and if not, generates or otherwise provides an indication of a recommended communications channel change based on the current ownship operational context (tasks 408, 410). For example, in one or more embodiments, a graphical user interface (GUI) display corresponding to the current configuration of the onboard radios may be dynamically updated to include text or some other graphic that recommends or suggests the recommended radio frequency channel to the pilot. In some embodiments, a button or similar selectable GUI element may be provided that can be selected or otherwise manipulated by a user to automatically tune the recommended radio frequency channel. In embodiments where the recommended communications channel is preselected or input to another standby or backup radio channel, the GUI display may be dynamically updated to include a graphical indication that the pilot should select or otherwise activate that alternate channel to make the recommended communications channel active upon the ownship operational context corresponding to an operational context where the frequency changeover is likely to occur based on prior radio frequency assignments.

In situations where the recommended communications channel is already selected or active onboard the aircraft, the illustrated channel recommendation process 400 continues by verifying or otherwise confirming that the current configuration of the radio with respect to the selected communications channel allows the pilot to communicate on that channel (task 412). For example, the frequency change detection application 226 may verify that the volume associated with the selected or active radio currently receiving the recommended communications channel is not muted or otherwise turned on above some threshold volume level to ensure that the pilot is able to hear or receive communications on the channel now that it is likely to be relevant based on the current operational context. Similarly, the frequency change detection application 226 may verify that the pilot's microphone or other audio input device(s) are not muted or disabled so that the pilot is capable of communicating on the channel now that it is likely to be relevant based on the current operational context. In this regard, when the current configuration associated with the recommended communications channel appears unlikely to support communications on the recommended communications channel, the frequency change detection application 226 may dynamically update the radio GUI display to include a graphical indication of how the pilot should modify or otherwise adjust the configuration of the radio to better support communications on the recommended communications channel now that it is relevant to the current ownship operational context.

Figure 6:
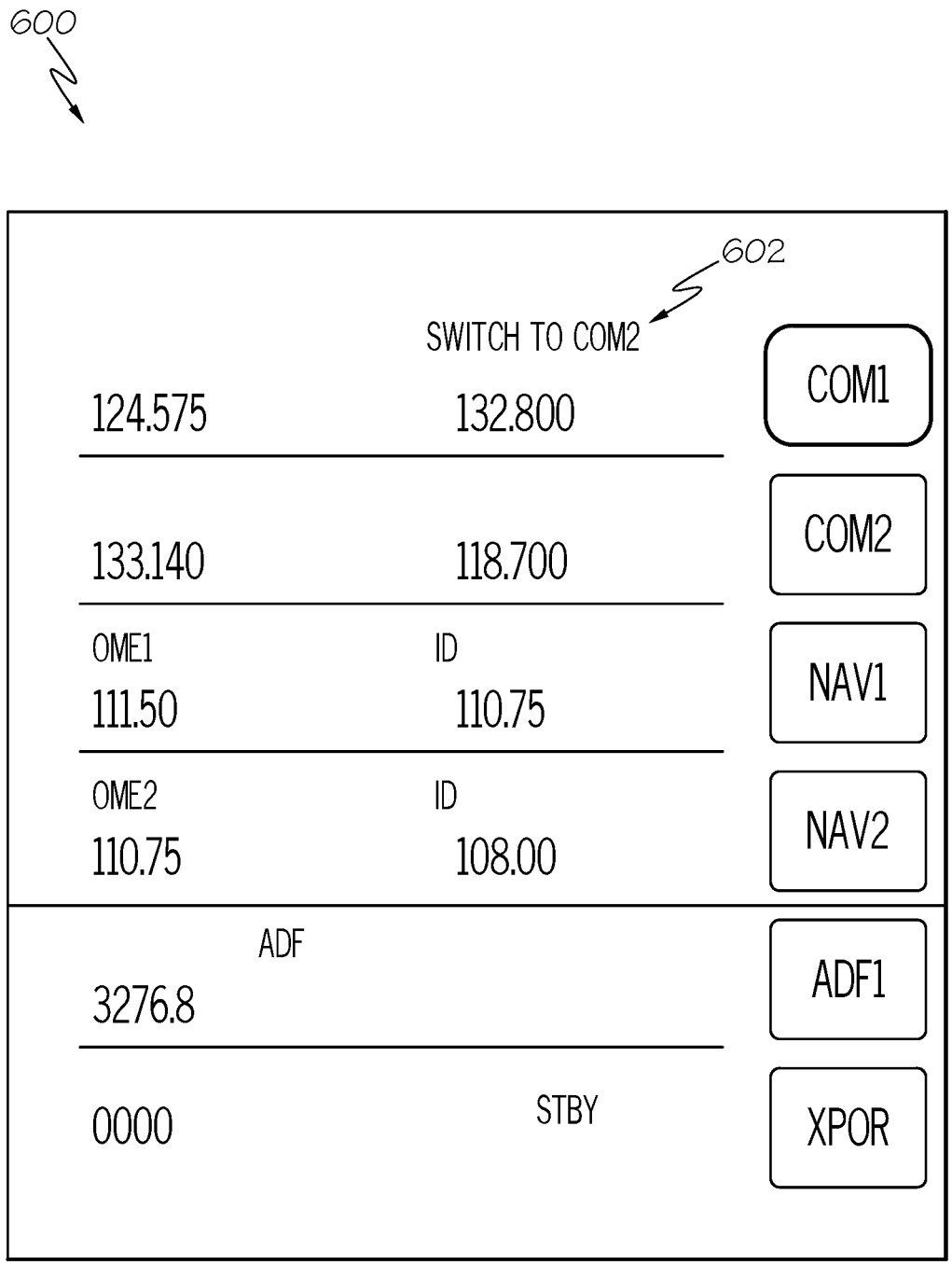
Figure 7:
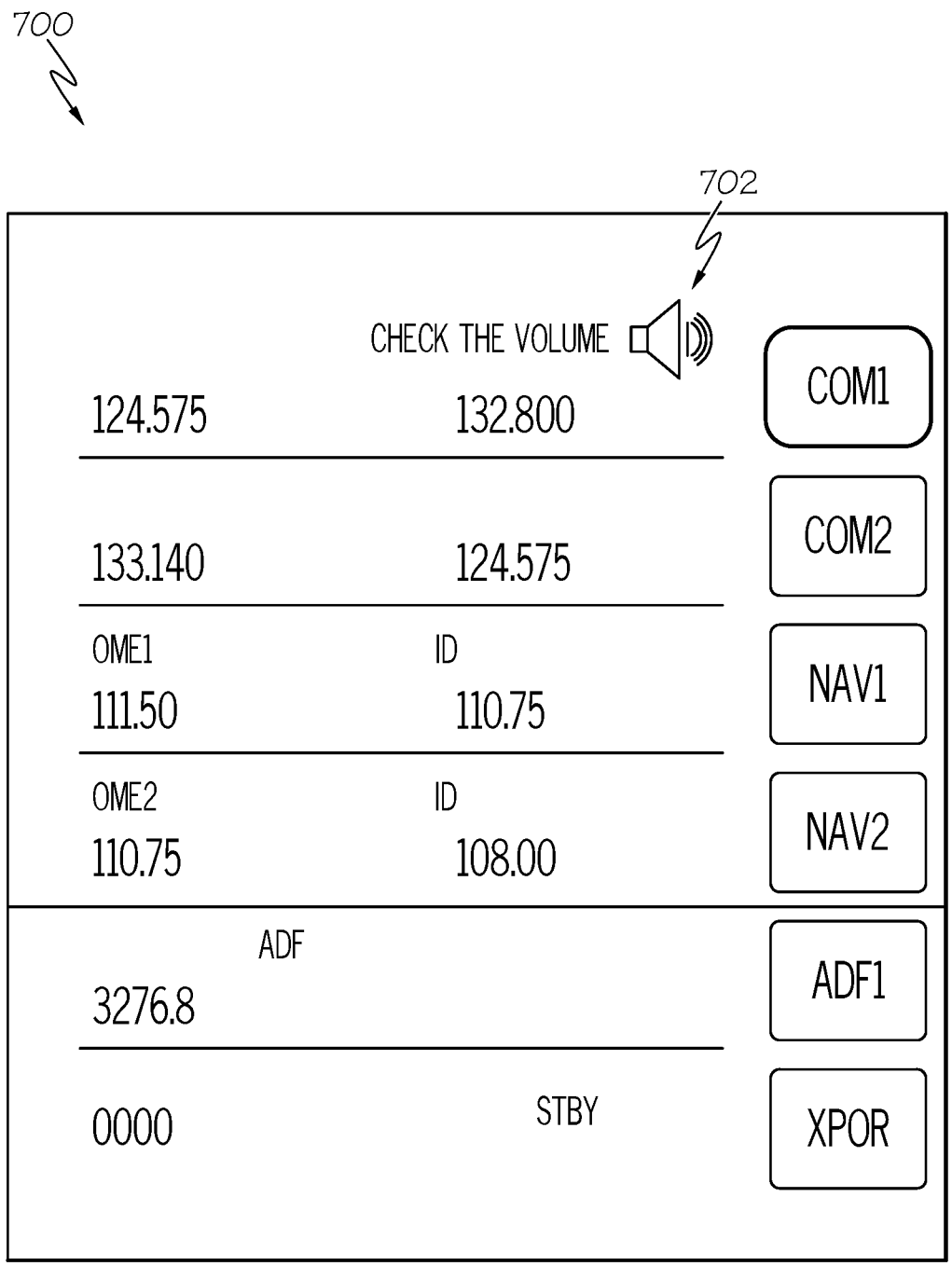

FIGS. 5-7 depict exemplary radio GUI displays that may be presented on a display device 102, 212 in conjunction with the channel recommendation process 400 of FIG. 4. The radio GUI display 500 of FIG. 5 depicts a scenario where the recommended communications channel is not currently tuned by any of the available communications radios supported by the communications system 206. Accordingly, in response to detecting the current ownship operational context maps to one or more prior radio frequency assignments given to other aircraft assigned the 127.85 MHz radio frequency channel, the frequency change detection application 226 dynamically updates the radio GUI display 500 to include a graphical indication 502 of the suggested 127.85 MHz radio frequency channel. Thus, if a pilot inadvertently enters the incorrect frequency (e.g., 127.87 MHz), either due to an erroneous entry or a miscommunication that is not corrected by a controller based on the pilot's read back, the pilot may be notified based on the mismatch between the currently selected communications frequency and the previously assigned communications frequency mapped to the current ownship operational context.

It should be noted that the channel recommendation process 400 may also provide protection against scenarios where a controller inadvertently fails to provide a radio frequency assignment to the ownship aircraft in a timely manner upon the ownship aircraft reaching a particular operational context where a radio frequency channel change should occur, or account for scenarios where the radio frequency channels currently being utilized within the airspace deviate from those previously anticipated by a pilot (e.g., due to anomalies like radio distortion on ground, frequency assignment changes, tower closures, and/or the like influencing ATC operations for a given controlled area). For example, a pilot may incorrectly assume or preemptively plan use of a particular radio frequency channel for a particular operational context based on prior experience, published procedure information, and/or the like and inadvertently fail to request or communicate with a controller about the appropriate communications channel to be utilized.

FIG. 6 depicts another exemplary radio GUI display 600 for a scenario where the recommended communications channel is currently tuned by the communications system 206 but is not currently active. Accordingly, in response to detecting that the recommended communications channel is not active upon the ownship aircraft reaching the operational context where the frequency changeover is expected to occur based on the mapping to one or more prior radio frequency assignments, the frequency change detection application 226 dynamically updates the radio GUI display 600 to include a graphical indication 602 to activate the recommended communications channel based on the current ownship operational context. In this regard, the channel recommendation process 400 provides protection for scenarios where a pilot correctly hears, enters, and/or reads back an assigned frequency, and believes the aircraft is currently communicating on the correct frequency when in fact the pilot has unknowingly failed to activate or switch over the audio output devices to that frequency.

FIG. 7 depicts another exemplary radio GUI display 700 for a scenario where the recommended communications channel is currently tuned and active, but the current configuration of the communications system 206 or other onboard audio elements may inhibit communications on the recommended communications channel. For example, in response to detecting that the volume associated with an audio output device 212 for the active radio channel is muted or below a threshold, the frequency change detection application 226 dynamically updates the radio GUI display 700 to include a graphical indication 702 to check the volume based on the current ownship operational context indicating the active recommended communications channel is likely to be relevant. This protects against scenarios where one or more preceding actions by a pilot to adjust the audio output may result in the pilot subsequently overlooking action required to restore communications capabilities. For example, a pilot using a headset may mute or turn down the cockpit loudspeaker volume, but then subsequently remove the headset without realizing the current state of the cockpit loudspeaker. Thus, when the ownship operational context indicates communications on the active channel are increasingly likely to be relevant, the frequency change detection application 226 verifies the configuration of the audio output devices and provides a notification to the pilot to check, verify, or otherwise adjust the audio output devices to ensure communications capabilities going forward. In a similar manner, the channel recommendation process 400 may support notifying the pilot to unmute his or her audio input device, or take other actions with respect to the configuration of the active radio to ensure communications capabilities going forward upon the active channel being relevant based upon the ownship operational context.

To briefly summarize, the subject matter described herein monitors pilot-controller communications in real-time to establish associations between radio frequency channel assignments and aircraft operational contexts and proactively suggest radio frequency channel changes when the ownship operational context corresponds or otherwise maps to an aircraft operational context associated with one or more prior radio frequency channel assignments. In this regard, when the ownship aircraft exhibits an operational context indicative of a likely radio frequency channel change based on prior radio frequency channel assignments, radio frequency channel change may be proactively recommended in real-time, which, in some embodiments, may occur prior to the controller issuing a radio frequency channel assignment to the ownship aircraft or prior to a pilot manually initiating a radio frequency channel change. Thus, the subject matter described herein may alert a pilot to a radio frequency channel change in a timely manner when a controller forgets or delays issuance of a radio frequency channel assignment, or when interference or other problems prevent the ownship aircraft from receiving or perceiving a radio frequency channel assignment. Additionally, by displaying the recommended radio frequency prior to entry, the likelihood of an erroneous entry or channel selection being made may be reduced, and/or such an error may be more readily identified by a pilot based on the visual discrepancy between the recommended radio frequency and the active radio frequency. In this regard, the subject matter described herein accounts for potential loss of communication scenarios that may go undetected by read back monitoring techniques. The real-time mapping of radio frequency channel assignments and aircraft operational contexts also accounts for situations where one or more radio frequencies being utilized in the operating area deviate from predefined procedures, or when a listing of radio frequencies associated with the current operating area is otherwise unavailable.

By concurrently background monitoring relevant frequencies (e.g., using standby channels, deactivated radios or tuners, software-defined radios, and/or the like) to the current operating area, a list or mapping of correct radio frequencies used by other aircraft traffic with respect to their respective operational contexts is created in real-time. In this regard, speech-to-text or other speech recognition processes may be performed to extract assigned radio frequency channels and operational contexts for the respective radio frequency assignments, which, in turn may be paired with other operational data for the respective aircraft derived from broadcast data (e.g., ADS-B) or other sources. The operational context parameters associated with the various extracted radio frequency channels is then compared to the ownship operational context in real-time to detect when a radio frequency change is anticipated to occur given the current ownship operational context, and in response, automatically recommend or suggest the extracted radio frequency channel that is associated with the current ownship operational context based on the mapping of preceding radio frequency assignments. Accordingly, the pilot may be proactively indicated of a probable radio frequency channel change along with the suggested destination radio frequency channel for tuning or selection. A pilot may also be notified in the event of an erroneous input or selection of the radio frequency channel after a correct read back of the radio frequency channel assignment.

It should be noted that while the subject matter may be described herein primarily in the context of implementation onboard an aircraft to recommend communications channel changes with respect to an ownship aircraft, in alternative embodiments, the subject matter may be implemented in an equivalent manner at an air traffic control location or other computing device or system that is not onboard the aircraft. For example, the channel recommendation process 400 may modify ADS-B or other broadcast data for aircraft within a controlled airspace to proactively identify when the operational context of a particular aircraft indicates a likely radio frequency assignment based on prior radio frequency assignments and automatically provide an indication to an air traffic controller of the recommended radio frequency assignment for that particular aircraft based on the prior radio frequency assignments. The air traffic controller may utilize the aircraft identifier and recommended radio frequency provided by the channel recommendation process 400 to issue the radio frequency assignment in a timely manner when contextually relevant to the aircraft receiving the assignment. In this regard, the subject matter described herein may be employed to protect against potential inadvertent failure or delay by an air traffic controller issuing a radio frequency assignment.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of monitoring a vehicle, the method comprising:
    monitoring a plurality of communications channels for a plurality of communications using a communications system;
    maintaining, in a data storage element, associations between respective communications channels and respective operational contexts of a plurality of different operational contexts based on the plurality of communications; and
    in response to detecting a change in an operational context of the vehicle, providing an indication of a recommended communications channel based on an association between the recommended communications channel and one of the plurality of different operational contexts corresponding to a current operational context of the vehicle.

2. The method of claim 1, wherein monitoring the plurality of communications channels comprises concurrently monitoring an active communications channel and one or more additional communications channels in the background.

3. The method of claim 2, further comprising:
    obtaining a listing of communications channels associated with an operating area encompassing a geographic location of the vehicle; and
    identifying the one or more additional communications channels by excluding one or more communications channels from the listing based at least on the operational context.

4. The method of claim 2, wherein concurrently monitoring the active communications channel and the one or more additional communications channels comprises monitoring the one or more additional communications channels using a software defined radio onboard the vehicle.

5. The method of claim 1, further comprising for each respective communication of the plurality of communications, extracting an operational context parameter and a radio frequency from the respective communication, wherein maintaining the associations comprises, for each respective communication of the plurality of communications, maintaining an association between the operational context parameter extracted from the respective communication and the radio frequency extracted from the respective communication.

6. The method of claim 5, wherein:
    the operational context parameter comprises a flight phase associated with a first communication of the plurality of communications; and
    providing the indication of the recommended communications channel comprises automatically providing indication of the radio frequency extracted from the first communication when a current flight phase corresponds to the flight phase associated with the first communication.

7. The method of claim 1, further comprising:
    for each respective communication of the plurality of communications:
        extracting an intended recipient identifier and a radio frequency from the respective communication; and
        obtaining a contemporaneous geographic location associated with an intended recipient using the intended recipient identifier, wherein maintaining the associations comprises, for each respective communication of the plurality of communications, maintaining an association between the contemporaneous geographic location and the radio frequency extracted from the respective communication.

8. The method of claim 7, wherein providing the indication of the recommended communications channel comprises automatically providing indication of the radio frequency extracted from a first communication of the plurality of communications when a current geographic location of the vehicle corresponds to the contemporaneous geographic location.

9. The method of claim 1, wherein:
    detecting the change comprises detecting a change to a flight phase of an aircraft; and
    providing the indication comprises:
        identifying a communications channel associated with a current flight phase of the aircraft based on an association between the communications channel and the current flight phase in the data storage element; and
        automatically providing indication of the communications channel on a display device.

10. The method of claim 1, wherein providing the indication comprises automatically providing indication of a first communications channel of the plurality of communications channels on a display device when a current geographic location of the vehicle corresponds to a geographic location associated with the first communications channel.

11. The method of claim 1, wherein providing the indication of the recommended communications channel comprises proactively recommending one of the plurality of communications channels in real-time when the current operational context corresponds to a respective operational context of the plurality of different operational contexts associated with the one of the plurality of communications channels.

12. The method of claim 1, wherein providing the indication of the recommended communications channel comprises modifying automatic dependent surveillance—broadcast (ADS-B) data.

13. The method of claim 1, wherein providing the indication of the recommended communications channel comprises modifying broadcast data for vehicles within a controlled area.

14. A non-transitory computer-readable medium having computer-executable instructions stored thereon that, when executed by a processing system, cause the processing system to:
- monitor a plurality of communications channels for a plurality of communications using a communications system;
- maintain associations between respective communications channels and respective operational contexts of a plurality of different operational contexts based on the plurality of communications; and
- in response to detecting a change in an operational context of a vehicle, provide an indication of a recommended communications channel based on an association between the recommended communications channel and one of the plurality of different operational contexts corresponding to a current operational context of the vehicle.

15. The non-transitory computer-readable medium of claim 14, wherein the computer-executable instructions cause the processing system to concurrently monitor an active communications channel and one or more additional communications channels in the background for the plurality of communications.

16. The non-transitory computer-readable medium of claim 15, wherein the computer-executable instructions cause the processing system to concurrently monitor the one or more additional communications channels using a software defined radio.

17. The non-transitory computer-readable medium of claim 14, wherein the computer-executable instructions cause the processing system to:
- extract, for each respective communication of the plurality of communications, an operational context parameter and a radio frequency from the respective communication; and
- maintain, for each respective communication of the plurality of communications, an association between the operational context parameter extracted from the respective communication and the radio frequency extracted from the respective communication.

18. The non-transitory computer-readable medium of claim 14, wherein for each respective communication of the plurality of communications, the computer-executable instructions cause the processing system to:
- extract an intended recipient identifier and a radio frequency from the respective communication;
- obtain a contemporaneous geographic location associated with an intended recipient using the intended recipient identifier; and
- maintain an association between the contemporaneous geographic location and the radio frequency extracted from the respective communication.

19. The non-transitory computer-readable medium of claim 14, wherein the computer-executable instructions cause the processing system to provide the indication of the recommended communications channel by modifying broadcast data for vehicles within a controlled area.

20. A system comprising:
- a data storage element maintaining associations between a respective assigned communications channel and a respective operational context for each of a plurality of channel assignment communications for a plurality of different vehicles; and
- a processing system coupled to the data storage element and configured to monitor the plurality of channel assignment communications, create the associations in the data storage element, and automatically provide an indication of a first assigned communications channel as a recommended communications channel when a current operational context corresponds to the respective operational context associated with the first assigned communications channel.

* * * * *